(12) United States Patent
Liu

(10) Patent No.: US 10,080,272 B2
(45) Date of Patent: Sep. 18, 2018

(54) ELECTRONIC CIGARETTE AND ELECTRONIC CIGARETTE LIGHT EMISSION CONTROL METHOD

(71) Applicant: SHENZHEN KIMSEN TECHNOLOGY CO., LTD, Shenzhen, Guangdong (CN)

(72) Inventor: Qiuming Liu, Guangdong (CN)

(73) Assignee: SHENZHEN KIMSEN TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 15/307,384

(22) PCT Filed: Apr. 30, 2014

(86) PCT No.: PCT/CN2014/076569
§ 371 (c)(1),
(2) Date: Oct. 28, 2016

(87) PCT Pub. No.: WO2015/165059
PCT Pub. Date: Nov. 5, 2015

(65) Prior Publication Data
US 2017/0064793 A1    Mar. 2, 2017

(51) Int. Cl.
*A24F 47/00*    (2006.01)
*H05B 37/02*    (2006.01)
(Continued)

(52) U.S. Cl.
CPC ......... *H05B 37/0227* (2013.01); *A24F 47/00* (2013.01); *A24F 47/008* (2013.01);
(Continued)

(58) Field of Classification Search
CPC .................................................... A24F 47/002
(Continued)

(56) References Cited

U.S. PATENT DOCUMENTS 9,439,455 B2 *   9/2016   Alarcon ................. A24F 47/00
2014/0278258 A1 *  9/2014   Shafer ..................... G01N 21/17
                                                 702/189
(Continued)

FOREIGN PATENT DOCUMENTS

CN   203314105 U   12/2013
CN   203482903 U    3/2014

OTHER PUBLICATIONS

International Search Report of PCT Patent Application No. PCT/CN2014/076569 dated Jan. 28, 2015.

*Primary Examiner* — Thuy Vinh Tran

(57) ABSTRACT

An electronic cigarette comprises at least one touch sensor, a microprocessor, and a light-emitting module. A control method comprises when a user touches the touch sensor, the touch sensor is triggered to generate an electric signal and transmit the electric signal to the microprocessor; the microprocessor controls the light-emitting module to emit a light on the basis of the electric signal transmitted by the touch sensor. The electronic cigarette light emission control method facilitates the user to find and use the electronic cigarette in the dark. Illumination with the light emitted by the electronic cigarette facilitates the user to walk in the dark, and, additionally, it facilitates the user to learn the power level of the electronic cigarette, while power saving is allowed by decreasing the intensity of light emission gradually.

2 Claims, 4 Drawing Sheets

(51) Int. Cl.
*G06F 3/041* (2006.01)
*H05B 1/02* (2006.01)
*H05B 33/08* (2006.01)

(52) U.S. Cl.
CPC ......... *G06F 3/0416* (2013.01); *H05B 1/0244* (2013.01); *H05B 33/0854* (2013.01); *H05B 33/0884* (2013.01); *H05B 37/0218* (2013.01); *A24F 47/002* (2013.01); *H05B 2203/021* (2013.01)

(58) Field of Classification Search
USPC ......................................................... 131/273
See application file for complete search history.

(56) References Cited

U.S. PATENT DOCUMENTS

| | | | |
|---|---|---|---|
| 2015/0053214 A1* | 2/2015 | Alarcon | A24F 47/00 131/273 |
| 2015/0059779 A1* | 3/2015 | Alarcon | A24F 47/00 131/273 |
| 2015/0305410 A1* | 10/2015 | Liu | A24F 47/008 131/329 |
| 2016/0007650 A1* | 1/2016 | Duncan | A24F 47/004 131/328 |

* cited by examiner

ELECTRONIC CIGARETTE AND ELECTRONIC CIGARETTE LIGHT EMISSION CONTROL METHOD

FIELD OF THE INVENTION

The present application relates to the field of electronic cigarettes, and more particularly relates to an electronic cigarette and the electronic cigarette light emission control method.

BACKGROUND OF THE INVENTION

An electronic cigarette is used for heating smoke liquid to produce an atomization effect, and the electronic cigarette is provided as a substitute for a cigarette.

In a prior art, in order to realize a smoking effect of a real cigarette on the electronic cigarette, normally, a lamp cap is defined, and a LED light is arranged inside the lamp cap. Then when a user of the electronic cigarette smokes, the LED light is lighten to make the lamp cap luminous; when a user of the electronic cigarette stops smoking, the LED light stop lighting. In this way, the smoking effect of the real cigarette can be realized when smoking the electronic cigarette.

From the above mentioned, the lamp cap is only luminous when the electronic cigarette in the prior art is working, but other surfaces of the electronic cigarette cannot be lighten. When the electronic cigarette does not work, the lamp cap does not emit light. Then a lighting equipment is needed to find a position of the electronic cigarette when a user needs to smoke in a dark room or other dark environments, the user only can smoke after getting the electronic cigarette, and if there are no lighting equipment in the environment, it is basically impossible to find the electronic cigarette, thus it is extremely inconvenient during a process of getting the electronic cigarette, especially for smokers who have smoking habits when they wake up at midnight, this defect of the electronic cigarette in the prior art is particularly prominent; besides, the electronic cigarette in the prior art only can realize the smoking effect of the real cigarette by emitting light, its function is singleness and cannot meet diversity demands of users.

SUMMARY OF THE INVENTION

Technical problems to be solved in the present invention is to provide the electronic cigarette and the electronic cigarette light emission control method, aiming at the above defects of the prior art.

The technical solutions of the present application for solving the technical problems are as follows: to provide the electronic cigarette light emission control method, wherein the electronic cigarette comprises at least one touch sensor, a microprocessor and a light-emitting module;

Wherein the method comprises: when the touch sensor is touched, the touch sensor is triggered to generate an electrical signal and transmits the electrical signal to the microprocessor; the microprocessor controls the light-emitting module to emit light according to the electrical signal transmitted by the touch sensor.

Advantageously, the electronic cigarette comprises a light-emitting area and a touch sensitive area;

Wherein the light-emitting module is defined at the light-emitting area;

The touch sensitive area is provided with at least two touch sensors, or the touch sensitive area is provided with the at least one touch sensor comprising two or at least two contact pieces, the contact pieces are configured for sensing a touch action of a user.

Advantageously, if the touch sensor is touched for a long time, a touch position is relatively static to the electronic cigarette, then the touch sensor is continuously triggered and generates the electrical signal which is continuous during the touch time, and the microprocessor controls the light emitting module to keep a constant light emission according to the electrical signal.

Advantageously, if a sliding contact with the touch sensor is happened, then the touch sensor is triggered and generates the electrical signal, the microprocessor receives the electrical signal and controls the light emitting module to emit light to show an electrical power of the electronic cigarette.

Advantageously, the touch sensor is touched, the touch sensor is triggered and generates the electrical signal, the microprocessor controls the light emitting module to emit light, and a luminous intensity of the light is from strong to weak, until it is extinguished.

Advantageously, the touch sensor comprises multiple contact pieces, when different contact pieces are touched, the touch sensor is triggered to generate different electrical signals, the microprocessor controls the light emitting module to display different light emitting effects according to the different electrical signals.

Advantageously, quantity of the contact pieces of the touch sensor is at least three;

When a contact or a coupling is happened between the user and a first contact piece, the touch sensor is triggered to generate a first electrical signal, the microprocessor receives the first electrical signal, then controls the light emitting module to emit strong light;

When a contact or a coupling is happened between the user and a second contact piece, the touch sensor is triggered to generate a second electrical signal, the microprocessor receives the second electrical signal, then controls the light emitting module to emit light to show an electrical power of the electronic cigarette;

When a contact or a coupling is happened between the user and a third contact piece, the touch sensor is triggered to generate a third electrical signal, the microprocessor receives the third electrical signal, then controls the light emitting module to emit light, and a luminous intensity of the light is from strong to weak, until it is extinguished.

Advantageously, quantity of the touch sensors is multiple, different touch sensors are touched to trigger and generate different electrical signals, the microprocessor controls the light emitting module to display different light emitting effects according to the different electrical signals;

When a first touch sensor is touched to trigger and generate a first electrical signal, the microprocessor receives the first electrical signal, then controls the light emitting module to emit strong light;

When a second touch sensor is touched to trigger and generate a second electrical signal, the microprocessor receives the second electrical signal, then controls the light emitting module to emit light o show an electrical power of the electronic cigarette;

When a third touch sensor is touched to trigger and generate a third electrical signal, the microprocessor receives the third electrical signal, then controls the light emitting module to emit light, and a luminous intensity of the light is from strong to weak, until it is extinguished.

Advantageously, the electronic cigarette is provided with a key switch or a photosensitive sensor for detecting light in an external environment of the electronic cigarette;

The microprocessor controls the light emitting module to emit light according to a signal transmitted by the key switch or the photosensitive sensor.

The present invention further discloses an electronic cigarette, comprising: at least one touch sensor, a microprocessor and a light-emitting module;

Wherein the touch sensor is electrically connected to the microprocessor, the light emitting module is electrically connected to the microprocessor;

The touch sensor is configured for being triggered to generate an electrical signal and transmitting the electrical signal to the microprocessor when the touch sensor is touched; and The microprocessor is configured for controlling the light-emitting module to emit light according to the electrical signal transmitted by the touch sensor.

Advantageously, the electronic cigarette comprises a light-emitting area and a touch sensitive area;

Wherein the light-emitting module is defined at the light-emitting area;

The touch sensitive area is provided with at least two touch sensors, or the touch sensitive area is provided with at least one touch sensor comprising two or at least two contact pieces, the contact pieces are configured for sensing a touch action of a user.

Advantageously, if the touch sensor is touched for a long time, a touch position is relatively static to the electronic cigarette, then the touch sensor is configured for being continuously triggered to generate the electrical signal during the touch time;

The microprocessor is configured for controlling the light emitting module to keep a constant light emission according to the electrical signal.

Advantageously, if a sliding contact with the touch sensor is happened, then the touch sensor is configured for being triggered to generate the electrical signal;

The microprocessor is configured for receiving the electrical signal and controlling the light emitting module to emit light to show an electrical power of the electronic cigarette.

Advantageously, the microprocessor is configured for controlling the light emitting module to emit light, and a luminous intensity of the light is from strong to weak, until it is extinguished.

Advantageously, the touch sensor comprises multiple contact pieces;

When different contact pieces are touched, the touch sensor is configured for being triggered to generate different electrical signals, the microprocessor is configured for controlling the light emitting module to display different luminous effects according to the different electrical signals.

Advantageously, quantity of the contact pieces of the touch sensor is at least three; when a contact or a coupling happened between the user and a first contact piece, the touch sensor is configured for being triggered to generate a first electrical signal, the microprocessor is configured for receiving the first electrical signal, then controlling the light emitting module to emit strong light;

When a contact or a coupling happened between the user and a second contact piece, the touch sensor is configured for being triggered to generate a second electrical signal, the microprocessor is configured for receiving the second electrical signal, then controlling the light emitting module to emit light to show an electrical power of the electronic cigarette;

When a contact or a coupling happened between the user and a third contact piece, the touch sensor is configured for being triggered to generate a third electrical signal, the microprocessor is configured for receiving the third electrical signal, then controlling the light emitting module to emit light, and a luminous intensity of the light is from strong to weak, until it is extinguished.

Advantageously, the touch sensor is a TTP224-BSB chip; the microprocessor is a SNBP2712 chip;

A thirteenth pin of the touch sensor is connected to a fourteenth pin of the microprocessor, a fourteenth pin of the touch sensor is connected to a thirteenth pin of the microprocessor, a fifteenth pin of the touch sensor is connected to a twelfth pin of the microprocessor, a sixteenth pin of the touch sensor is connected to an eleventh pin of the microprocessor.

Advantageously, the light emitting module comprises a first light emitting diode D1, a second light emitting diode D2 and a third light emitting diode D3; the electronic cigarette further comprises a power supply;

A positive electrode of the first light emitting diode D1 is connected to the power supply via a resistance R2, a negative electrode of the first light emitting diode D1 is connected to an eighth pin of the microprocessor;

A positive electrode of the second light emitting diode D2 is connected to the power supply via a resistance R3, a negative electrode of the second light emitting diode D2 is connected to a ninth pin of the microprocessor;

A positive electrode of the third light emitting diode D3 is connected to the power supply via a resistance R1, a negative electrode of the third light emitting diode D3 is connected to a seventh pin of the microprocessor.

Advantageously, quantity of the touch sensors is multiple;

The touch sensors whose quantity is multiple are all connected to the microprocessor;

The microprocessor is configured for controlling the light emitting module to display different luminous effects according to the different electrical signals;

A first touch sensor is configured for being triggered to generate a first electrical signal, the microprocessor is configured for receiving the first electrical signal, then controlling the light emitting module to emit strong light;

A second touch sensor is configured for being triggered to generate a second electrical signal, the microprocessor is configured for receiving the second electrical signal, then controlling the light emitting module to emit light to show an electrical power of the electronic cigarette;

A third touch sensor is configured for being triggered to generate a third electrical signal, the microprocessor is configured for receiving the third electrical signal, then controlling the light emitting module to emit light, and a luminous intensity of the light is from strong to weak, until it is extinguished.

Advantageously, the electronic cigarette is provided with a key switch or a photosensitive sensor for detecting light in an external environment of the electronic cigarette;

The microprocessor controls the light emitting module to emit light according to a signal transmitted by the key switch or the photosensitive sensor.

Applications of the electronic cigarette and electronic cigarette light emission control method of the present invention has following advantages: as the electronic cigarette can be lighten as long as the user touches the electronic cigarette, it facilitates the user to find and use the electronic cigarette in the dark, especially for smokers who have smoking habits when they wake up at midnight, its convenience is particularly prominent; and as the light being emitted by the electronic cigarette can be used as an illumination, it facilitates the user to walk in the dark; additionally, it facilitates the user to learn a power level of the electronic cigarette, and power saving is allowed by adjusting the intensity of light emission from strong to weak; thus to meet the diversity demands of users.

BRIEF DESCRIPTION OF THE DRAWINGS

The present application will be further described with reference to the accompanying drawings and embodiments in the following, in the accompanying drawings.

DETAILED DESCRIPTION OF THE PREFERRED EMBODIMENT

To make the technical feature, objective and effect of the present application be understood more clearly, now the specific implementation of the present application is described in detail with reference to the accompanying drawings and embodiments.

In an electronic cigarette and an electronic cigarette light emission control method of embodiments of the present invention, at least one touch sensor is defined at the electronic cigarette, when a user touches the touch sensor, light emitting of the electronic cigarette, power level showing and other functions can be realized. Then on the basis of realizing a smoking effect of a real smoke, the electronic cigarette also can be convenient for users to search and use in a darkness, walk in a darkness and know the power level of the electronic cigarette and so on.

Figure 1:
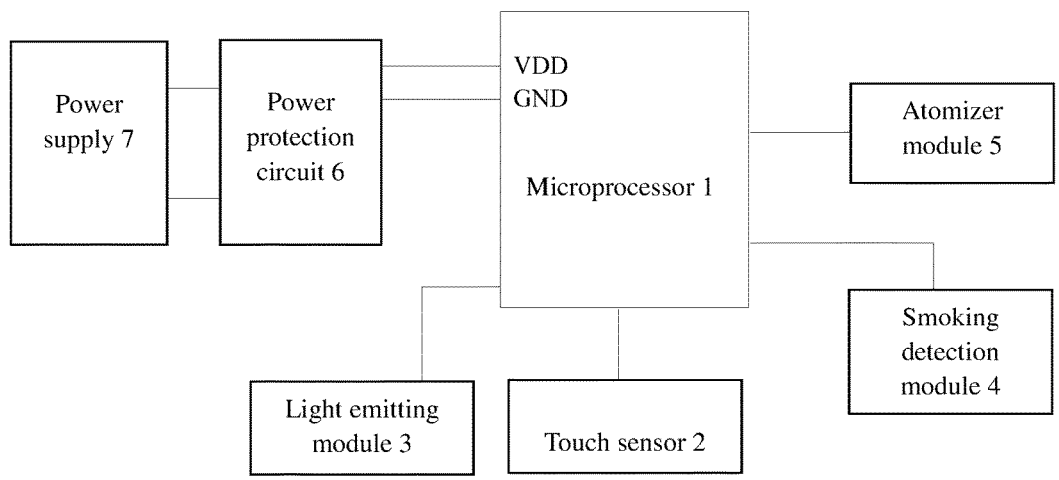
FIG. 1 is a structural block view of an electronic cigarette of one embodiment of the present invention.

As shown in FIG. 1 which is a structural block view of an electronic cigarette of one embodiment of the present invention. The electronic cigarette of the embodiment of the present invention comprises: at least one touch sensor 2, a microprocessor 1 and a light emitting module 3.

The touch sensor 2 can be defined on surfaces of the electronic cigarette. when a user touches the touch sensor 2, the touch sensor 2 is triggered to generate an electrical signal, and transmits the electrical signal to the microprocessor 1. The microprocessor 1 controls the light emitting module 3 to emit light according to the electrical signal transmitted by the touch sensor 2.

Figure 2:
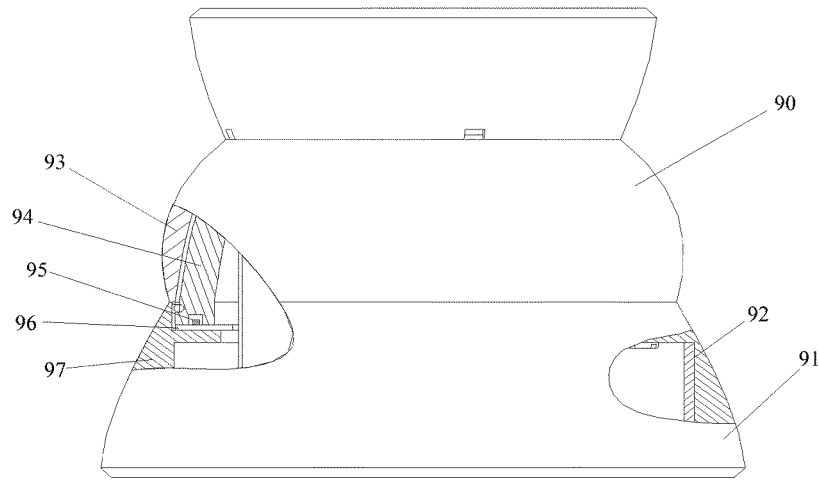
FIG. 2 is a structural schematic view of an electronic cigarette of one embodiment of the present invention.

As illustrated in FIG. 2, in one embodiment of the present invention, a light-emitting area 90 and a touch sensitive area 91 are defined at a suction nozzle of the electronic cigarette. Wherein a display board 93, a light guide plate 94, the light emitting module 3 which is a LED light 95, a PCB board 96 are defined inside the light-emitting area 90. A bottom case 97 is defined at the bottom of electronic cigarette. A touch sensing circuit board 92 which is provided with the touch sensor 2 is defined at the touch sensitive area 91.

Figure 3:
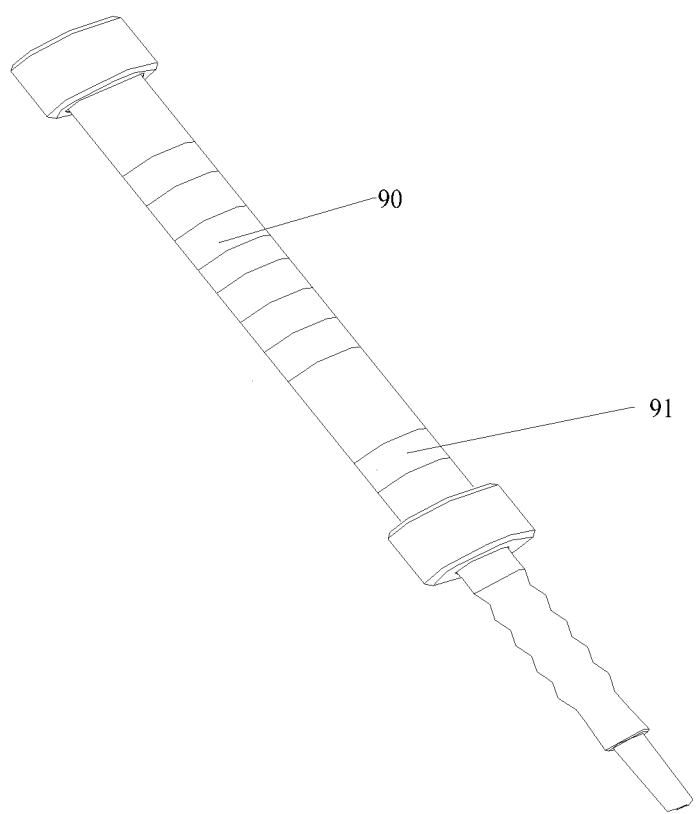
FIG. 3 is a structural schematic view of an electronic cigarette of the other embodiment of the present invention.

Referring to FIG. 3, in the other embodiment of the present invention, a light-emitting area 90 and a touch sensitive area 91 are defined at a battery rod of the electronic cigarette. Understandably, the light emitting module 3 is defined at the light-emitting area 90, and the touch sensor 2 is defined at the touch sensitive area 91.

In the embodiments of the present invention, the touch sensitive area 91 is provided with at least two touch sensors, or the touch sensitive area 91 is provided with at least one touch sensor comprising two or at least two contact pieces.

In the first embodiment of the present invention, process that a microprocessor controls the light emitting module comprises: if the user touches the touch sensor 2 for a long time, a touch position of the user is relatively static to the electronic cigarette, then the touch sensor 2 is continuously triggered and generates a continuous electrical signal during the touch time, and the microprocessor 1 controls the light emitting module 3 to keep a constant light emission according to the electrical signal. If the user has a sliding contact with the touch sensor 2, then the touch sensor 2 is triggered and generates an electrical signal, the microprocessor 1 receives the electrical signal and controls the light emitting module 3 to emit light to show an electrical power of the electronic cigarette. For example, the light emitting module 3 can show the electrical power of the electronic cigarette by controlling a size of luminous area or a degree of brightness.

The electronic cigarette of the first embodiment of the present invention facilitates the user to find and use the electronic cigarette in the dark, and it is convenient for the user to learn the electrical power of the electronic cigarette, and contributes to a timely charging of the electronic cigarette.

In the second embodiment of the present invention, process that a microprocessor controls the light emitting module comprises: the user touches the touch sensor 2, then the touch sensor 2 is triggered and generates an electrical signal, the microprocessor 1 controls the light emitting module 3 to emit light, and a luminous intensity of the light is from strong to weak, until it is extinguished.

The electronic cigarette of the second embodiment of the present invention facilitates the user to find the electronic cigarette in the dark while power saving is allowed.

In the third embodiment of the present invention, the electronic cigarette is provided with multiple touch sensors 2, the user touches different touch sensors 2 to trigger and generate different electrical signals, the microprocessor 1 controls the light emitting module 3 to display different light emitting effects according to the different electrical signals;

Specifically, quantity of the touch sensors 2 is at least three. The user touches a first touch sensor to trigger and generate a first electrical signal, the microprocessor 1 receives the first electrical signal, then controls the light emitting module to emit strong light. The user touches a second touch sensor to trigger and generate a second electrical signal, the microprocessor 1 receives the second electrical signal, then controls the light emitting module 3 to emit light to show an electrical power of the electronic cigarette. The user touches a third touch sensor to trigger and generate a third electrical signal, the microprocessor 1 receives the third electrical signal, then controls the light emitting module 3 to emit light, and a luminous intensity of the light is from strong to weak, until it is extinguished.

Besides, in order to realize the different light emitting effects via different trigger work of the user, the touch sensor 2 can also comprise multiple contact pieces. When the user touches different contact pieces, the touch sensor is triggered to generate different electrical signals, the microprocessor controls the light emitting module to display different light emitting effects according to the different electrical signals. Specifically, quantity of the contact pieces of the touch sensor is at least three; when a contact or a coupling is happened between the user and a first contact piece, the touch sensor 2 is triggered to generate a first electrical signal, the microprocessor 1 receives the first electrical signal, then controls the light emitting module 3 to emit strong light; when a contact or a coupling is happened between the user and a second contact piece, the touch sensor 2 is triggered to generate a second electrical signal, the microprocessor receives the second electrical signal, then controls the light emitting module to emit light to show an electrical power of the electronic cigarette; when a contact or a coupling is happened between the user and a third contact piece, the touch sensor 2 is triggered to generate a third electrical signal, the microprocessor 1 receives the third electrical signal, then controls the light emitting module 3 to emit light, and a luminous intensity of the light is from strong to weak, until it is extinguished.

The electronic cigarette of the third embodiment of the present invention facilitates the user to walk in the dark, the light emitted by the electronic cigarette can be used as an illumination, and facilitates the user to learn the power level of the electronic cigarette, while power saving is allowed by adjusting the luminous intensity of light emission from strong to weak.

In the embodiments of the present invention, the touch sensor 2 can be realized by applying a TTP224-BSB chip or a TTP224N-BSB chip. The light emitting module 3 comprises multiple LED lights, the microprocessor 1 can realize changes of luminous intensities, displays of the electrical power and other functions by controlling lightening LED lights' numbers, positions and so on. The light emitting module 3 also can be a LCD screen, under the control of the microprocessor, the LCD screen can realize changes of luminous intensities, displays of the electrical power and other functions. Specifically, the microprocessor 1 can indicate the electrical power by controlling a size of luminous area or a degree of brightness of the light emitting module 3, for instance, a relationship between the size of the luminous area and the electrical power is set to be proportional, when the luminous area is large, the electrical power is high, otherwise the electrical power is low. Besides, if the light emitting module 3 is a LCD screen, then the microprocessor 1 can control the light emitting module 3 to show the electrical power directly according the electrical power which is detected and the electrical signal which is generated by the touch sensor 2, for instance, showing the electrical power is 30%.

The electronic cigarette of the embodiments of the present invention is further provided with a key switch or a photosensitive sensor for detecting light in an external environment of the electronic cigarette; the microprocessor controls the light emitting module to emit light according to a signal transmitted by the key switch or the photosensitive sensor. Specifically, it can be defined as following: the microprocessor only receives the electrical signal of the touch sensor after the key switch is turned on, thus to realize a control of the light emitting module; or the microprocessor only senses a touch action of the user after the key switch is turned on. Then an occurrence of false trigger of the user can be prevented, and the user is allowed to further realize a control of the electronic cigarette light emitting (for instance, the key switch is only turned on in the dark environment). After applying the photosensitive sensor to detect an external environment light of electronic cigarette, it can be set as following: when the external environment light is lower than a preset value, the microprocessor controls the light emitting module to emit light according to the electrical signal generated by the touch sensor. As a result, that the light emitting module only emit light when the external environment light is dark (that is, in the dark environment) can be realized, so as to save the electrical power.

Figure 4:
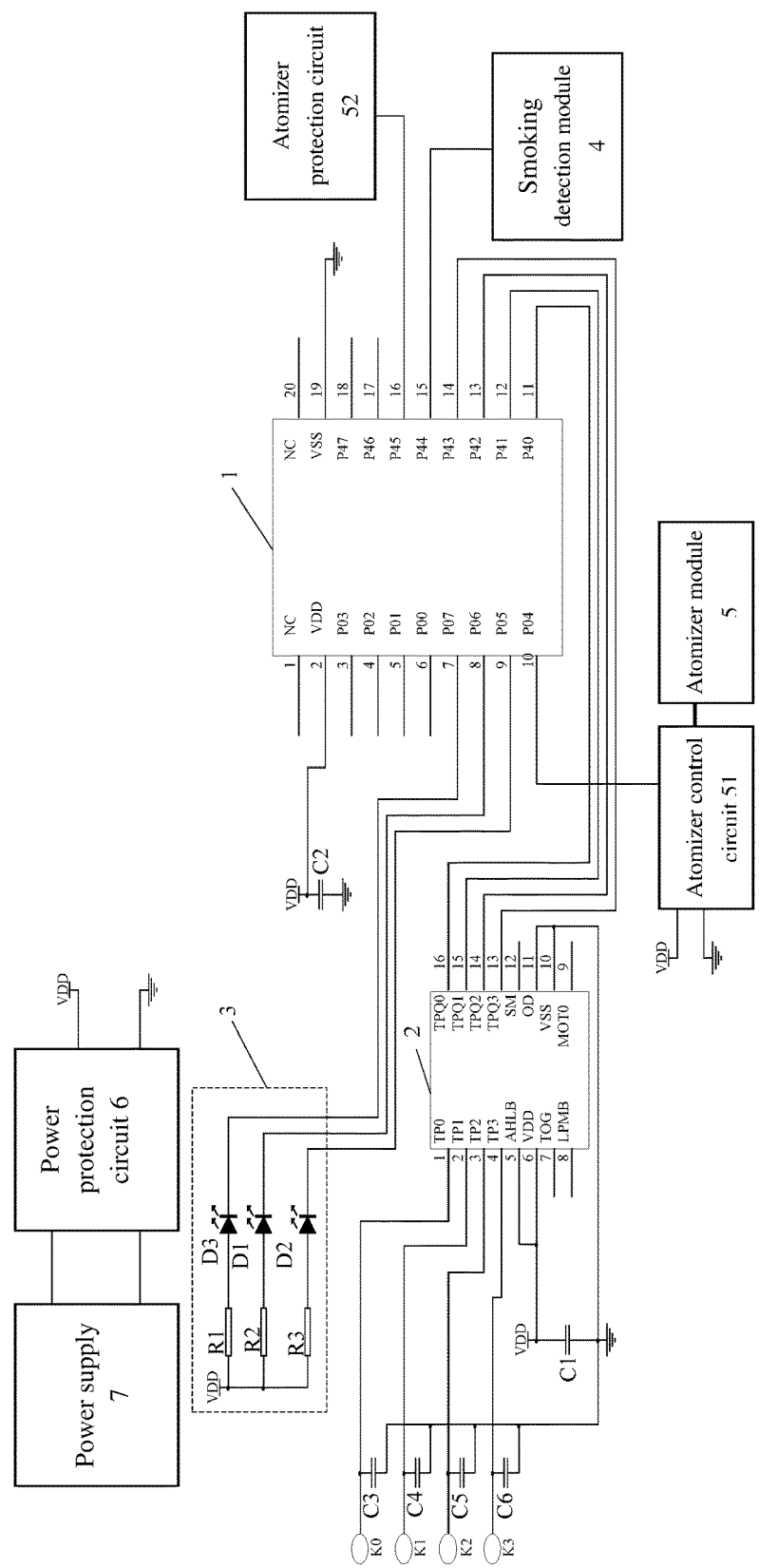
FIG. 4 is a circuit diagram of an electronic cigarette of one embodiment of the present invention.

The electronic cigarette of the embodiments of the present invention is described in details below in a conjunction with FIG. 4. Referring to FIG. 4, the touch sensor 2 is realized by applying a TTP224-BSB chip, the microprocessor 1 is realized by applying a SNBP2712 chip. A thirteenth pin (a TPQ3 pin) of the touch sensor 2 is connected to a fourteenth pin (a P43 pin) of the microprocessor 1, a fourteenth pin (a TPQ2 pin) of the touch sensor 2 is connected to a thirteenth pin (a P42 pin) of the microprocessor 1, a fifteenth pin (a TPQ1 pin) of the touch sensor 2 is connected to a twelfth pin (a P41 pin) of the microprocessor 1, a sixteenth pin (a TPQ0 pin) of the touch sensor 2 is connected to an eleventh pin (a P40 pin) of the microprocessor 1, so as to realize that the electrical signal which is triggered by the user touching the K0, K1, K2 or K3 is transmitted to the microprocessor 1. The microprocessor 1 can control output voltages of a P05 pin, a P06 pin and a P07 pin according to electrical signals of the P40-P43 pins, so that luminous intensities of a first light emitting diode D1 to a third light emitting diode D3 can be controlled. As a result, the microprocessor 1 can control the output voltages of the P05 pin, the P06 pin and the P07 pin, so as to control a luminous intensity of the light emitting module 3 (i.e., the first light emitting diode D1 to the third light emitting diode D3 shown in the FIG. 4) from strong to weak, until it is extinguished. Maybe, the microprocessor can control the output voltages of the P05 pin, the P06 pin and the P07 pin, thereby controlling the light emitting module (i.e., the first light emitting diode D1 the third light emitting diode D3 shown in the FIG. 4) to emit a continuously constant light as well. Besides, the microprocessor 1 also can further control the light emitting module 3 to emit light sequentially or in other forms after receiving the electrical signal.

Understandably, when the light emitting module 3 in the embodiments of the present invention is a LCD screen, the microprocessor 1 can realize a display of the electrical power of the electronic cigarette by controlling output voltages of pins which are connected to the LCD screen.

As illustrated in FIG. 4, in the embodiments of the present invention, electrical signals triggered by the user touching the K0, K1, K2 or K3 can be set different. As a result, the microprocessor 1 can realize different controls of the light emitting module 3 according to different electrical signals. For instance, if the microprocessor 1 receives an electrical signal which is triggered by the K0, then controls the light emitting module 3 to emit strong light; if the microprocessor 1 receives an electrical signal which is triggered by the K1, then controls the light emitting module 3 to emit light o show an electrical power of the electronic cigarette; if the microprocessor 1 receives an electrical signal which is triggered by the K2, then controls the light emitting module 3 to emit light, and a luminous intensity of the light is from strong to weak, until it is extinguished.

Besides, in the embodiments of the present invention, contact pieces K0, K1, K2 and K3 can be set in an arrangement, then a change regulation of contact pieces' values on adjacent contact pieces can be analyzed to obtain whether the user has a sliding contact with the touch sensor, and if it is the sliding contact, the electrical power can be shown.

Referring to FIG. 4, the electronic cigarette of the embodiments of the present invention further comprises an atomizer module 5, an atomizer control circuit 51, a smoking detection module 4, an atomizer protection circuit 52, a power supply 7 and a power protection circuit 6. Wherein the atomizer control circuit 51 is connected with a PO4 pin of the microprocessor 1, the atomizer module 5 is connected to the atomizer control circuit 51. In an actual implementation, the atomizer control circuit 51 may be a switching tube, it is switched on or off according to a control of the microprocessor 1, thus to drive or stop the atomizer module 5. The atomizer module 5 may be electrical heating wires, when the electrical heating wires are driven, e-liquids in the electronic cigarette can be heated to generate smoking effects.

The atomizer protection circuit 52 is connected to a P45 pin of the microprocessor 1 and is configured for protecting the atomizer module 5. Specifically, the atomizer protection circuit 52 can realize protections of the atomizer module 5, such as an over-voltage, a filtering, a short-circuit and so on, through a voltage and current sampling.

The smoking detection module 4 is connected to a P44 pin of the microprocessor 1 and is configured for detecting a smoking signal. Specifically, when the smoking detection module 4 detects a smoking signal, the microprocessor 1 controls the atomizer control circuit 51 to drive the atomizer module 5. In an actual implementation, the smoking detection module 4 may be an air pressure sensor or an airflow sensor, etc.

In the embodiments of the present invention, the electronic cigarette is power supplied by the power supply 7. The power supply 7 can be a power supply as a 3~5V battery, or be connected to an external power supply and electrically supplied by the external power supply. The power protection circuit 6 is configured for realizing protections of the power supply 7, such as an overvoltage, a filtering, a short-circuit and so on, through a voltage and current sampling.

Referring to FIG. 4, a positive electrode of the first light emitting diode D1 of the light emitting module is connected to the power supply via a resistance R2, a negative electrode of the first light emitting diode D1 is connected to an eighth pin of the microprocessor 1; a positive electrode of the second light emitting diode D2 is connected to the power supply via a resistance R3, a negative electrode of the second light emitting diode D2 is connected to a ninth pin of the microprocessor; a positive electrode of the third light emitting diode D3 is connected to the power supply via a resistance R1, a negative electrode of the third light emitting diode D3 is connected to a seventh pin of the microprocessor.

Referring to FIG. 4, in the embodiments of the present invention, a power supply voltage of the power supply 7 can be obtained by detecting a voltage of a first pin of the microprocessor 1. A corresponding relationship between the electrical power and a value of a power supply voltage is pre-stored in the microprocessor 1. After receiving the power supply voltage, the microprocessor 1 inquiries to obtain the corresponding electrical power (i.e., a remaining electrical power of the power supply 7) according the power supply voltage. Understandably, the electrical power can also be calculated and obtained by other means.

The electronic cigarette in the embodiments of the present invention facilitates the user to find and use the electronic cigarette in the dark, and an illumination with the light emitted by the electronic cigarette facilitates the user to walk in the dark; additionally, it facilitates the user to learn the power level of the electronic cigarette, while power saving is allowed by adjusting the intensity of light emission from strong to weak.

Figure 5:
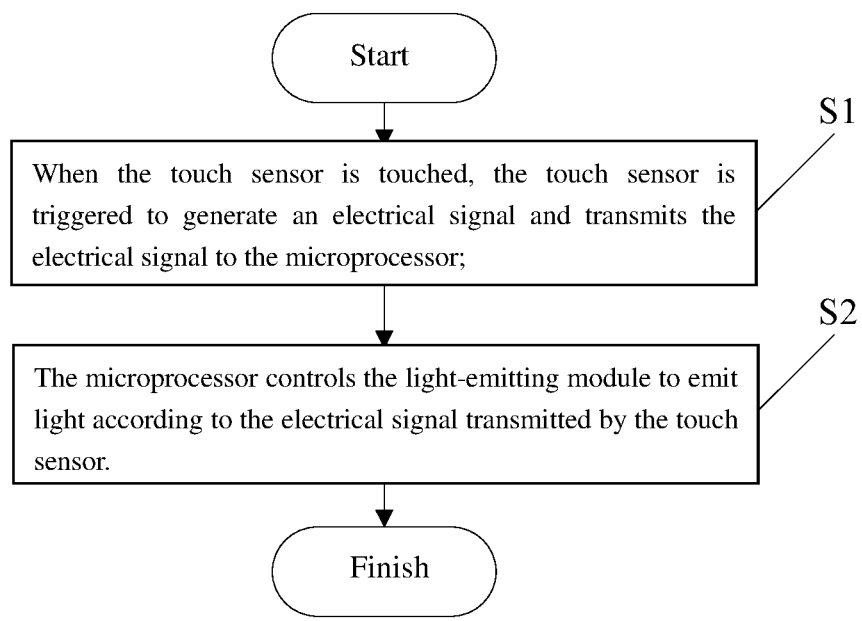
FIG. 5 is a flow chart of an electronic cigarette light emission control method of one embodiment of the present invention.

Referring to FIG. 5 which is a flow chart of an electronic cigarette light emission control method of one embodiment of the present invention, the electronic cigarette of the electronic cigarette in the embodiments of the present invention comprises: at least one touch sensor, a microprocessor and a light emitting module.

An electronic cigarette light emission control method in the embodiments of the present invention comprises following steps:

S1: when a user touches the touch sensor, the touch sensor is triggered to generate an electrical signal and transmits the electrical signal to the microprocessor;

S2: the microprocessor controls the light-emitting module to emit light according to the electrical signal transmitted by the touch sensor.

Specifically, in the electronic cigarette light emission control method of the first embodiment of the present invention, in the step S1, if the user touches the touch sensor for a long time, and a touch position of the user is relatively static to the electronic cigarette, then the touch sensor is continuously triggered and generates a continuous electrical signal during the touch time; then in the step S2, the microprocessor controls the light emitting module to keep a constant light emission according to the electrical signal.

In the electronic cigarette light emission control method of the second embodiment of the present invention, in the step S1, if the user has a sliding contact with the touch sensor, then the touch sensor is triggered and generates an electrical signal; in the step S2, the microprocessor receives the electrical signal and controls the light emitting module to emit light to show an electrical power of the electronic cigarette.

In the electronic cigarette light emission control method of the third embodiment of the present invention, in the step S1, the user touches the touch sensor, the touch sensor is triggered and generates an electrical signal, then in the step S2, the microprocessor controls the light emitting module to emit light, and a luminous intensity of the light is from strong to weak, until it is extinguished.

In the fourth embodiment of the present invention, quantity of the touch sensors is multiple, in the step S1, the user touches different touch sensors to trigger and generate different electrical signals; in the step S2, the microprocessor controls the light emitting module to display different luminous effects according to the different electrical signals;

In one embodiment, preferably, quantity of the touch sensors is at least three. If in the step S1, the user touches a first touch sensor to trigger and generate a first electrical signal, then in the step S2, the microprocessor receives the first electrical signal, and controls the light emitting module to emit strong light. If in the step S1, the user touches a second touch sensor to trigger and generate a second electrical signal, then in the step S2, the microprocessor receives the second electrical signal, and controls the light emitting module to emit light to show an electrical power of the electronic cigarette. If in the step S1, the user touches a third touch sensor to trigger and generate a third electrical signal, then in the step S2, the microprocessor receives the third electrical signal, and controls the light emitting module to emit light, and a luminous intensity of the light is from strong to weak, until it is extinguished.

Understandably, in the embodiments of the present invention, if the touch sensor comprises multiple contact pieces, it can be set that different electrical signals are generated when different contacts pieces are touched, thus to realize that the microprocessor controls the light emitting module to emit strong light, to show an electrical power of the electronic cigarette or to change a luminous intensity of the light from strong to weak via the different electrical signals when the user touches different contact pieces, and generates the different electrical signals. For instance, quantity of the contact pieces is at least three; when a contact or a coupling is happened between the user and a first contact piece, the touch sensor is triggered to generate a first electrical signal, the microprocessor receives the first electrical signal, then controls the light emitting module to emit strong light; when a contact or a coupling is happened between the user and a second contact piece, the touch sensor is triggered to generate a second electrical signal, the microprocessor receives the second electrical signal, then controls the light emitting module to emit light to show an electrical power of the electronic cigarette; when a contact or a coupling is happened between the user and a third contact piece, the touch sensor is triggered to generate a third electrical signal, the microprocessor receives the third electrical signal, then controls the light emitting module to emit light, and a luminous intensity of the light is from strong to weak, until it is extinguished.

The electronic cigarette of the embodiments of the present invention is further provided with a key switch or a photosensitive sensor for detecting light in an external environment of the electronic cigarette; the microprocessor controls the light emitting module to emit light according to a signal transmitted by the key switch or the photosensitive sensor.

Understandably, in the electronic cigarette light emission control method of the embodiments of the present invention is corresponding to the electronic cigarette of the embodiments of the present invention.

In the electronic cigarette light emission control method, because as long as the user touches the electronic cigarette, the electronic cigarette can emit light, it facilitates the user to find and use the electronic cigarette in the dark, especially for smokers who have smoking habits when they wake up at midnight, its convenience is particularly prominent; and an illumination with the light emitted by the electronic cigarette facilitates the user to walk in the dark; additionally, it facilitates the user to learn the power level of the electronic cigarette, while power saving is allowed by adjusting the intensity of light emission from strong to weak; thus to meet the diversity demands of users.

While the embodiments of the present application are described with reference to the accompanying drawings above, the present application is not limited to the abovementioned specific implementations. In fact, the abovementioned specific implementations are intended to be exemplary not to be limiting. In the inspiration of the present application, those ordinary skills in the art can also make many modifications without breaking away from the subject of the present application and the protection scope of the claims. All these modifications belong to the protection of the present application.

The invention claimed is:

1. An electronic cigarette light emission control method, wherein the method comprises:
   touching a touch sensor of an electronic cigarette, the touch sensor is triggered to generate an electrical signal and transmit the electrical signal to a microprocessor of the electronic cigarette;
   controlling, by the microprocessor, a light-emitting module to emit light according to the electrical signal transmitted by the touch sensor; and
   wherein the touch sensor comprises multiple contact pieces, when different contact pieces are touched, the touch sensor is triggered to generate different electrical signals, the microprocessor controls the light emitting module to display different light emitting effects according to the different electrical signals;
   wherein quantity of the contact pieces of the touch sensor is at least three;
   when a contact or a coupling is happened between a user and a first contact piece, the touch sensor is triggered to generate a first electrical signal, the microprocessor receives the first electrical signal, then controls the light emitting module to emit light for the user to look for or to use the electronic cigarette in the dark;
   when a contact or a coupling is happened between the user and a second contact piece, the touch sensor is triggered to generate a second electrical signal, the microprocessor receives the second electrical signal, then controls the light emitting module to emit light to show an electrical power of the electronic cigarette;
   when a contact or a coupling is happened between the user and a third contact piece, the touch sensor is triggered to generate a third electrical signal, the microprocessor receives the third electrical signal, then controls the light emitting module to emit light, and a luminous intensity of the light decreases gradually until it is extinguished.

2. An electronic cigarette, comprising: at least one touch sensor, a microprocessor and a light-emitting module;
   wherein the touch sensor is electrically connected to the microprocessor, the light emitting module is electrically connected to the microprocessor;
   wherein the touch sensor is configured for being triggered to generate an electrical signal and transmitting the electrical signal to the microprocessor when the touch sensor is touched; and
   the microprocessor is configured for controlling the light-emitting module to emit light according to the electrical signal transmitted by the touch sensor; and
   wherein the electronic cigarette further comprises a light-emitting area and a touch sensitive area;
   wherein the light-emitting module is defined at the light-emitting area; and
   wherein the touch sensor comprises multiple contact pieces;
   when different contact pieces are touched, the touch sensor is configured for being triggered to generate different electrical signals, the microprocessor is configured for controlling the light emitting module to display different luminous effects according to the different electrical signals;
   wherein quantity of the contact pieces of the touch sensor is at least three;
   when a contact or a coupling is happened between a user and a first contact piece, the touch sensor is triggered to generate a first electrical signal, the microprocessor receives the first electrical signal, then controls the light emitting module to emit light for the user to look for or to use the electronic cigarette in the dark;
   when a contact or a coupling is happened between the user and a second contact piece, the touch sensor is triggered to generate a second electrical signal, the microprocessor receives the second electrical signal, then controls the light emitting module to emit light to show an electrical power of the electronic cigarette;
   when a contact or a coupling is happened between the user and a third contact piece, the touch sensor is triggered to generate a third electrical signal, the microprocessor receives the third electrical signal, then controls the light emitting module to emit light, and a luminous intensity of the light decreases gradually until it is extinguished.

* * * * *